(12) United States Patent
Lima et al.

(10) Patent No.: US 8,570,015 B2
(45) Date of Patent: *Oct. 29, 2013

(54) DC-DC CONVERTER

(75) Inventors: Floriberto Amorim Azevedo Lima, Lisbon (PT); Pedro Faria de Oliveira, Pedroucos (PT); Daniel Lourenco dos Santos, Lisbon (PT)

(73) Assignee: Synopsys, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/252,057

(22) Filed: Oct. 3, 2011

(65) Prior Publication Data

US 2012/0019224 A1      Jan. 26, 2012

Related U.S. Application Data

(63) Continuation of application No. 12/057,171, filed on Mar. 27, 2008, now Pat. No. 8,030,910.

(60) Provisional application No. 61/019,143, filed on Jan. 4, 2008.

(51) Int. Cl.
*G05F 1/00*         (2006.01)

(52) U.S. Cl.
USPC .......................................................... 323/283

(58) Field of Classification Search
USPC .................. 323/222, 271, 282, 283, 284, 285
See application file for complete search history.

(56) References Cited

U.S. PATENT DOCUMENTS

| | | | |
|---|---|---|---|
| 5,479,089 A | 12/1995 | Lee | |
| 7,615,981 B2 | 11/2009 | Wong et al. | |
| 7,786,714 B2 * | 8/2010 | Bacchi et al. | 323/282 |
| 7,852,055 B2 | 12/2010 | Michishita | |
| 2006/0273772 A1 * | 12/2006 | Groom | 323/284 |
| 2007/0257647 A1 | 11/2007 | Chen et al. | |
| 2008/0012540 A1 * | 1/2008 | Chen | 323/224 |

* cited by examiner

*Primary Examiner* — Nguyen Tran
(74) *Attorney, Agent, or Firm* — Bever, Hoffman & Harms, LLP; Jeanette S. Harms

(57) ABSTRACT

A dual-mode switching voltage regulator has a duty cycle that varies with the input and output voltages so as to dynamically compensate for changes in the operating conditions. The switching voltage regulator uses input and output voltages/currents to optimize the duty cycle of the signals applied to a pair of switches disposed in the regulator. In the PFM mode, a control block senses the time that a first switch used to discharge an inductor is turned off. If the control block senses that the first switch is opened too early, the control block increases the on-time of a second switch used to charge the inductor. If the control block senses that the first switch is opened too late, the control block decreases the on-time of the second switch.

21 Claims, 6 Drawing Sheets

DC-DC CONVERTER

CROSS-REFERENCES TO RELATED APPLICATIONS

The present application is a continuation of U.S. patent application Ser. No. 12/057,171 filed Mar. 27, 2008, entitled DC-DC Converter which claims benefit under 35 USC 119(e) of U.S. provisional application No. 61/019,143, filed Jan. 4, 2008, entitled "Technique To Optimize The PFM Mode Operation Of DC-DC Converter", the content of which is incorporated herein by reference in its entirety.

BACKGROUND OF THE INVENTION

The present invention relates to a switching voltage regulator circuit, and more particularly to a control circuit for maintaining high operational efficiency across a broad range of input and output voltages in a switching voltage regulator circuit.

In integrated circuits (IC), there is often a need to generate a lower DC voltage from a higher DC supply voltage that is relatively unstable and noisy. A voltage regulator is often required to operate under a relatively wide range of input voltages and to have a programmable output voltage. One known circuit for achieving this is commonly referred to as a pulse width modulated (PWM) voltage regulator, a simplified block diagram of which is shown in FIG. 1. PWM regulator 10 is shown as including a PWM signal generator 20, a driver 25, an inductor 30, a load resistor 40 and a feedback controller 45. Supply voltage $V_{in}$ is pulse-width modulated by PWM regulator 10 and is subsequently supplied as output voltage signal $V_{OUT}$. Resistive load 40 is typically externally supplied. Feedback controller 45 is adapted to maintain $V_{OUT}$ nearly equal to reference voltage $V_{REF}$ and further to maintain stability in the loop.

FIG. 2 is a simplified schematic diagram of driver 25 in communication with inductor 30, capacitor 35 and load resistor 40, as known in the prior art. Driver 25 is shown as including switches Sw1 and Sw2 that respectively enable inductor 30 to be charged and discharged. FIG. 3 shows the inductor current as a function of the on/off periods of switches Sw1 and Sw2. During each switching period $T_{sp}$, switch Sw1 is on for a first fixed period $T_1$, switch Sw2 is on for a second fixed period $T_2$, and both switches are off for a third fixed period $T_3$. During period $T_1$, inductor 30 is charged in accordance with the following expression:

$$i_L(t) = I_{L0} + \frac{1}{L}\int_0^t v_{IN} - v_{out} dt,$$

where L is the inductance of inductor 30. Likewise, during the period $T_2$ inductor 30 is discharged in accordance with the following expression:

$$i_L(t) = I_{L0} - \frac{1}{L}\int_0^t v_{OUT} dt.$$

Assume, for example, that regulator 10 is designed to receive a maximum input voltage of 5 volts and supply a minimum output voltage of 0.6 volts. Assume regulator 10 is also adapted to operate in the pulse-frequency modulation (PFM) mode. Accordingly, period $T_1$ would be fixed to approximately 10% of the switching period. If a user decides to use regulator 10 under a different input/output operating conditions, such as to convert an input voltage of 3.2 volts to an output voltage of 1.6 volts, because the period $T_1$ is fixed, a significant amount of time during each switching period that could otherwise be used to charge and discharge inductor 30 would be wasted. Regulator 10 is thus inefficient.

FIGS. 4A and 4B show an exemplary 16 cycles of a switching period $T_{sp}$ of regulator 10. In FIG. 4A, the charging period $T_1$, i.e., the period during which signal A is asserted to charge the inductor, is relatively short. Therefore, period $T_3$, during which both switches are non-conductive, cannot be used to charge the inductor. The inductor current $I_L$ remains zero during this period. In FIG. 4B, the charging period is relatively long thus inhibiting the inductor to be fully discharged, in turn, causing the current during the next period to be higher and output voltage ripple to increase.

SUMMARY OF THE INVENTION

A switching voltage regulator, in accordance with one embodiment of the present invention, includes in part, an inductor, a pair of switches and a control block. A first switch is responsive to a first signal and causes the inductor to be charged during a first period. A second switch is responsive to a second signal and causes the inductor to be discharge during a second period. The control block varies the duty cycle of the first signal in accordance with a feedback signal that represents an output voltage of the switching voltage regulator.

In one embodiment, the switching voltage regulator includes a comparator that compares a voltage across the second switch to a first voltage and generates a comparison signal whose level varies depending on the direction of the current flow through the switch, i.e., depending on whether this current is direct or reversed. The comparator optionally includes a current-to-voltage converter adapted to convert the current flowing through the second switch to a voltage so as to determine whether the second switch is to be in an open or closed state. In one embodiment, the control block includes a counter that increments its count if a transition from the second level to the first level of the first comparison signal is detected as leading a corresponding transition of a target signal. The counter's count is decremented if the corresponding transition from the second level to the first level of the first comparison signal is detected as lagging a transition of the target signal. The duty cycle of the first signal is varied in accordance with the counter's count.

In one embodiment, the switching voltage regulator includes a mode selector responsive to the comparator and adapted to select between a pulse-width modulation and a pulse-frequency modulation mode of operation. The mode selector switches from the pulse-width modulation mode to the pulse-frequency modulation mode of operation if a sum of the first and second periods is less than a predefined value for N consecutive switching periods of the switching voltage regulator. In one embodiment, the switching voltage regulator switches from the pulse-frequency modulation mode to the pulse-width modulation mode if following M consecutive switching periods, the output voltage of the switching voltage regulator does not reach a predefined level.

In one embodiment, the control block varies the duty cycle of the first signal such that a sum of the first and second periods is substantially equal to the switching period of the switching voltage regulator. In one embodiment, the control block samples the state of the second switch for a configurable number of times before incrementing or decrementing the counter. The switching voltage regulator includes circuitry adapted to ensure that the first and second switches are not in on states at the same time.

In accordance with another embodiment of the present invention, a method of regulating an input voltage includes, in part, applying a first signal to close a first switch during a first period to charge an inductor, applying a second signal to close a second switch during a second period to discharge the inductor, and varying the duty cycle of the first signal in accordance with a feedback signal representative of the output voltage.

One embodiment of the method of the present invention further includes comparing a voltage across the second switch to a first voltage to generate a comparison signal having a first level if the second switch is detected as being in an open state, and a second level if the second switch is detected as being in a closed state. In one embodiment, the current flowing through the second switch is converted to a voltage. In one embodiment, the method further includes incrementing a count if a transition from the second level to the first level of the first comparison signal is detected as leading a corresponding transition of a target signal, decrementing the count if the transition from the second level to the first level of the first comparison signal is detected as lagging the corresponding transition of the target signal, and varying the duty cycle of the first signal in accordance with the counter's count.

One embodiment of the method of the present invention further includes selecting between a pulse-width modulation mode and a pulse-frequency modulation mode of operation in response to the comparison signal. A switch from the pulse-width modulation mode to the pulse-frequency modulation mode of operation may be made if a sum of the first and second periods is less than a predefined value for N consecutive switching periods. A switch from the pulse-frequency modulation mode to the pulse-width modulation mode of operation may be made if following M consecutive switching periods, the output voltage does not reach a predefined level.

One embodiment of the method of the present invention disables the generation of the first and second signals if the feedback voltage is detected as being less than a reference voltage. In one embodiment, the state of the second switch is sampled for a configurable number of times prior to incrementing or decrementing the count. In one embodiment, the first switch is opened prior to turning on the second switch. In another embodiment, the duty cycle of the first signal is varied such that a sum of the first and second periods is substantially equal to the switching period.

DETAILED DESCRIPTION OF THE INVENTION

A switching voltage regulator (hereinafter alternatively referred to as regulator), in accordance with one embodiment of the present invention, is adapted to operate in a pulse-width modulation (PWM) mode when driving a normal load, and a pulse-frequency modulation (PFM) mode when driving a light load. The regulator has a duty cycle that varies with the input and output voltages so as to dynamically compensate for changes in the operating conditions. To achieve this, in one embodiment, the regulator uses input and output voltages/currents to vary the duty cycle of a pair of switches disposed in the regulator. In another embodiment, a tuning machine searches for and applies the optimal duty cycle. The tuning machine optimizes the on-times of switches in order to maximize the PFM period utilization and to achieve efficiency optimization over a wide range of loads. While operating in the PFM mode, a control block senses the time that a switch used to discharge an inductor is turned off. If the control block senses that this switch is turned off too early, the control block increases the on-time of another switch used to charge the inductor. The switches used to charge and discharge the inductor are respectively referred to herein as master and slave switches. If the control block senses that the slave switch is turned off too late, the control block decreases the on-time of the master switch. Accordingly, a regulator in accordance with the present invention, maximizes the on-times of the switches and optimizes efficiency over a wide range of loads, as described further below. In one embodiment, the duty cycle of the master switch is varied such that the sum of on-times of the master and slave switches is substantially equal to the switching period of the regulator. For example, if the duty cycle of the master switch is 50%, then the sum of on-times of the master and slave switches is +/−2 periods of the master switch. If, for example, the duty cycle of the master switch is 25%, then the sum of on-times of the master and slave switches is +/−4 periods of the master switch. Likewise, if, for example, the duty cycle of the master switch is near 100%, then the sum of on-times of the master and slave switches is +/−1 period of the master switch.

Figure 5:
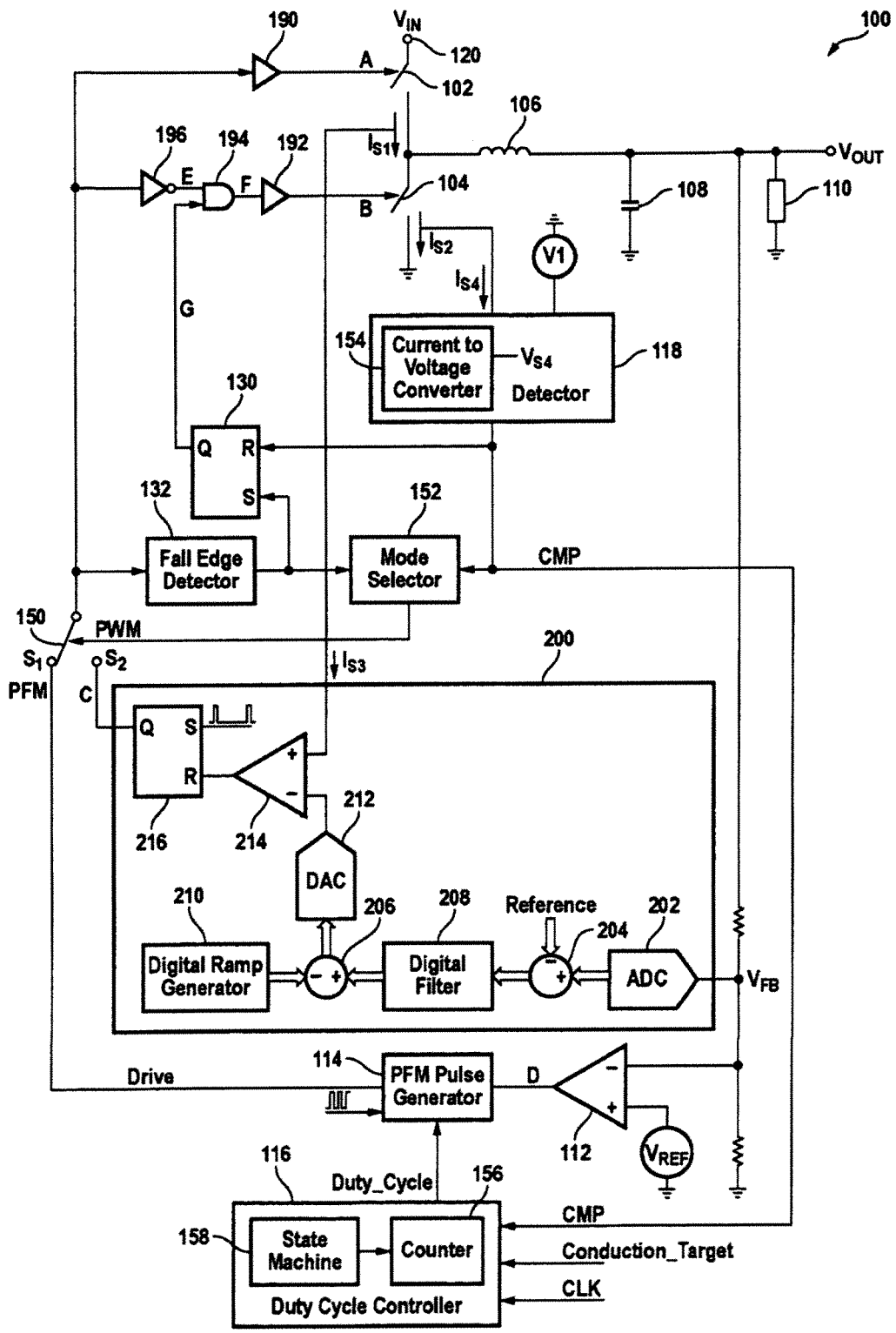
FIG. 5 is a block diagram of a switching voltage regulator, in accordance with one embodiment of the present invention.

FIG. 5 is a high-level block diagram of a regulator 100, in accordance with one exemplary embodiment of the present invention. Regulator 100 operates in the PFM mode when switch 150 is in the $S_1$ position, and in the PWM mode when switch 150 is in the $S_2$ position. Switch 150 is responsive to mode selector 152 which selects between the PFM and PWM mode of operations, as described further below.

Analog-to-digital converter (ADC) 202, signal combiners 204, 206, digital filter 208, digital ramp generator 210, digital-to-analog converter (DAC) 212, comparator 214, and RS latch 216 collectively form a pulse-width modulator 200. Pulse-width modulator 200 receives feedback voltage $V_{FB}$, representative of regulated output voltage $V_{OUT}$, and current $I_{S3}$, representative of current $I_{S1}$ flowing through switch 104, and generates in response a pulse-width modulated signal C as an output signal. ADC 202 is adapted to convert the analog voltage $V_{FB}$ to a digital voltage value and supply the digital voltage value to signal combiner 204. Signal combiner subtracts a reference voltage from the digital voltage value it receives to thereby to generate an error voltage which it subsequently supplies to digital filter 208. Digital filter 208 is adapted to provide stability in the control loop and supply the filtered error signal to signal combiner 206. Signal combiner 206 is adapted to subtract a ramp signal—supplied by digital ramp generator 210—from the filtered error signal and to deliver the resulting signal to DAC 212. DAC 212 is adapted to convert the digital signal it receives to a corresponding analog signal and to supply the converted signal to comparator 214. When the current signal $I_{S3}$—which is proportional to current $I_{S1}$—is greater than DAC 212's output signal, flip-flop-flop 216 is reset, which in turn, causes switch 102 to be turned off. A clock signal is applied to the set terminal of flip-flop 216 to cause switch 102 to be turned on.

Mode selector 152 switches from the PWM mode to the PFM mode when, for example, resistive load 110 changes from having a normal value to a relatively smaller (light) value. Such a load change is reflected in the switching period utilization of regulator 100. If the switching period utilization, defined as the sum of the on-times of switches 102, 104, falls below a first threshold value in response to, for example, a change in the resistive load value from normal to light, mode selector 152 selects the PFM mode by placing switch 150 in the $S_1$ position. Once in the PFM mode, if the number of consecutive pulses required from PFM pulse generator 114 to reach regulation exceeds a second threshold value, regulator 100 switches back from the PFM mode to the PWM mode of operation. For example, if the sum of the switching times of switches 102, 104 during each of P consecutive switching periods is less than Q % (e.g. 70%) of the switching period, mode selector 152 switches from the PWM to the PFM mode of operation. Once in the PFM mode of operation, if mode selector 152 detects that signal $V_{OUT}$ has not reached the required regulation level after K (e.g., 8) consecutive switching periods, mode selector 152 switches to the PWM mode of operation. Accordingly, if mode selector 152 determines that output signal D of comparator 112 remains at a first (e.g., low) logic state (indicating that voltage $V_{OUT}$ is less than the required regulated level) for K consecutive periods, mode selector 152 switches to PWM mode of operation by placing switch 150 in the S2 position. The sum of the on-times of switches 102 and 104 is determined, in part, by the falling edge of signal Drive that is used to set flip-flop 130.

Switch 102, hereinafter alternatively referred to as a master switch, is responsive to signal A. When closed, switch 102 enables voltage supply 120 to charge inductor 106. Conversely, when switch 102 is open, voltage supply 120 is decoupled from inductor 106. Switch 104, which is a slave to master switch 10 and is hereinafter alternatively referred to as a slave switch, is responsive to signal B. When closed, switch 104 provides a discharge path from inductor 106 to the ground terminal. Conversely when switch 104 is open, the discharge path between inductor 106 and the ground terminal is removed. Switch 104 is a slave to switch 102 and is only turned on after master switch 102 is turned off.

Comparator 112 is a hysteretic comparator adapted to compare feedback voltage $V_{FB}$ to a reference voltage $V_{ref}$. If comparator 112 detects that output voltage $V_{FB}$ is greater than reference voltage $V_{ref}$, signal D supplied by comparator 112 causes PFM pulse generator 114 to be off during the subsequent switching cycle to maintain $V_{OUT}$ in regulation. If comparator 112 detects that feedback voltage $V_{FB}$ is smaller than reference voltage $V_{ref}$, signal D supplied by comparator 112 causes PFM pulse generator 114 to be activated during the subsequent switching cycle. Once activated, PFM pulse generator 114 generates a pulse in accordance with signal Duty-_Cycle, supplied by duty cycle control block 116, in order to bring output voltage $V_{OUT}$ in regulation, as described further below.

Assume switch 150 is in the $S_1$ position thus placing regulator 100 in the PFM mode of operation. Comparator 118 receives current $I_{S4}$ that is representative of current $I_{S2}$ flowing through switch 104 at its first input terminal. Comparator 118 includes a current-to-voltage converter 154 that converts current $I_{S4}$ to a corresponding voltage $V_{S4}$ and compares voltage $V_{S4}$ to voltage $V_1$ applied to the second terminal of comparator 118. Comparator 118 generates an output signal CMP that is either in a first logic state or a second logic state depending on whether voltage $V_{S4}$ is greater or smaller than $V_1$. When switch 104 is in a closed state, current is enabled to flow from inductor 106 through switch 104 to the ground. The resulting non-zero voltage $V_{S4}$ causes output voltage signal CMP to be in a first logic state (e.g., low) if current $I_{S4}$ is higher then a predefined level, or to a second logic state (e.g., high) if current $I_{S4}$ is lower than the predefined level. This predefined level may be changed by varying voltage $V_1$. When switch 104 is in an open state, comparator 118 is disabled and the output voltage CMP is held at the first logic state (e.g., low). In other words, comparator 118 senses the presence or absence of current flow through switch 104 and varies the state of signal CMP accordingly.

Duty-cycle control block 116 compares the transitions on signal CMP to the transitions of the clock signal Conduction-_Target. If signal CMP is detected as leading signal Conduction_Target, indicating that switch 104 is opened relatively early, a counter 156 disposed in duty-cycle control block 116 increments its count. If signal CMP is detected as lagging signal Conduction_Target, indicating that switch 104 is opened relatively late, counter 156 decrements its count. Signal Duty_cycle represents counter 156's count. PFM pulse generator 114 varies the duty cycle of signal Drive applied to buffer 190 in accordance with the count of counter 156. In one embodiment, transitions of signal Conduction_Target are caused to occur concurrently with the transitions of the switching period so as to maximize the on-times of switches 102 and 104. Regulator 100 dynamically compensates for the changes in the operating conditions to minimize the off times (non-conductivity) of the master and slave switches 102 and 104 during each switching period. Consequently, regulator 100 has an increased efficiency and an enhanced flexibility. For example, if during switching period M, switch 104 is detected as opening earlier than desired, counter 156's count is incremented by one, thereby increasing signal Drive's duty cycle during the subsequent switching period M+1. In contrast, for example, if during switching period M, switch 104 is detected as opening later than desired, counter 156's count is decremented by one, thereby decreasing signal Drive's duty cycle during the subsequent switching period M+1. In one embodiment, as long as regulator 100 remains in the PFM mode of operation, during each switching period, signal Duty_cycle is either incremented or decremented in response to the relative transitions of signals CMP and Conduction_Target. Therefore, in such embodiments, the duty cycle of signal Drive is varied by one increment during each switching period.

Assume signal Drive is an active high signal. The logic high state of signal Drive causes switch 102 to be in a closed state—via buffer 190 which generates signal A—for a period defined by counter 156's count. The high logic level of signal D causes signals E, F and B, respectively generated by inverter 196, AND gate 194 and buffer 192, to be at low levels. Consequently, while switch 102 is in a closed (conductive) state, switch 104 is maintained in an open (non-conductive) state thus enabling inductor 106 to be charged from input voltage $V_{in}$. After signal Drive changes state to a low level, signals A and B change their respective states to low and high, thereby causing switch 102 to open and switch 104 to close. Consequently, while switch 104 is in a closed state, switch 102 is maintained in an open state thus enabling inductor 106 to be discharged.

Signal CMP is applied to the reset input terminal of flip-flop 130. Accordingly, the low-to-high transition on signal CMP causes output signal G of flip-flop 130 to go low. The low logic level of signal G causes signal F and B to remain low, notwithstanding the logic level of signal Drive. Signal G remains low until falling edge detector 132 sets flip-flop 132 by detecting a high-to-low transition (edge) of signal Drive. When flip-flop 130's output signal G is set, the high-to-low transition on signal Drive is enabled to propagate to switch 104 via AND gate 194 and buffer 192 to close switch 104. Falling edge detector 132 is adapted to detect high-to-low transitions of the signal applied to buffer 190. Upon detecting such transitions, flip-flop 130 is set, thereby causing signal G to be asserted. The assertion of signal G, in turn, causes signal B to be asserted to turn on switch 104.

Figure 1:
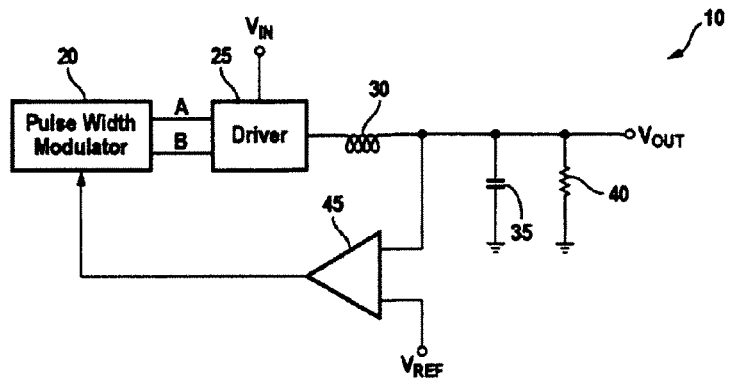
FIG. 1 is a schematic diagram of a PWM switching voltage regulator, as known in the prior art.
Figure 2:
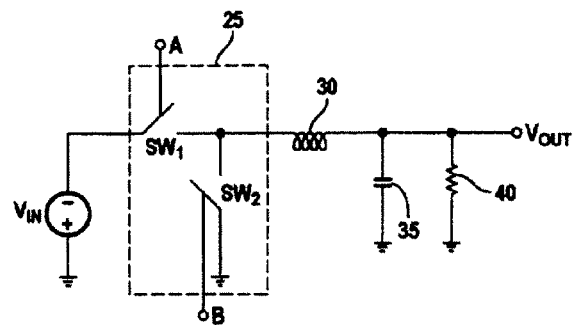
FIG. 2 shows, in part, the switches used to charge and discharge the inductor disposed in the regulator of FIG. 1, as known in the prior art.
Figure 3:
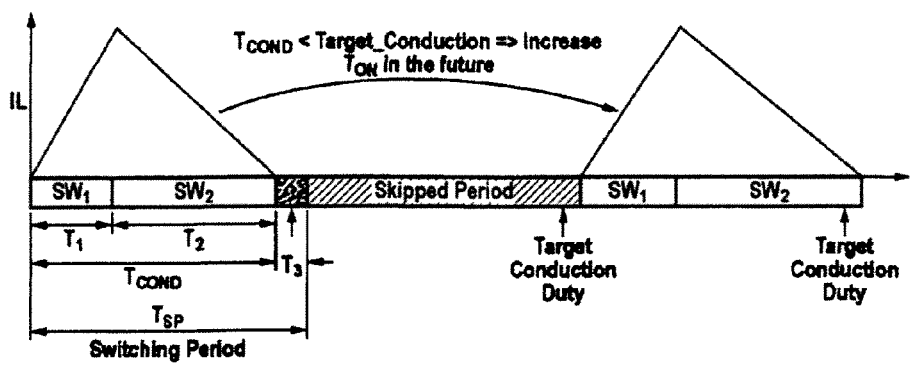
FIG. 3 shows the inductor current as a function of the on and off times of the switches shown in FIG. 2, as known in the prior art.
Figure 4A:
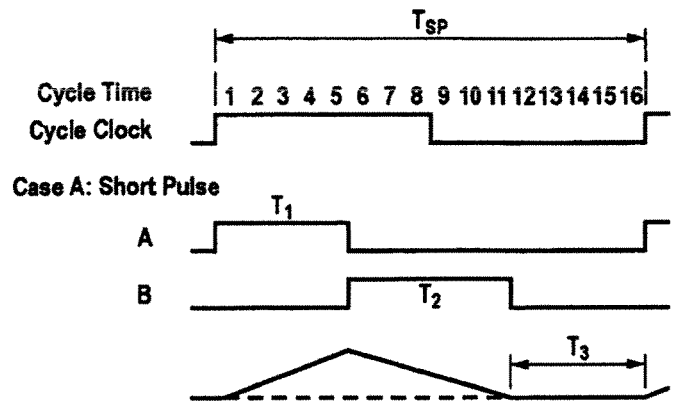
FIGS. 4A and 4B show exemplary cycles of a switching period as well as the inductor charging and discharging current as a function of the switching times of a switching voltage regulator, as known in the prior art.
Figure 4B:
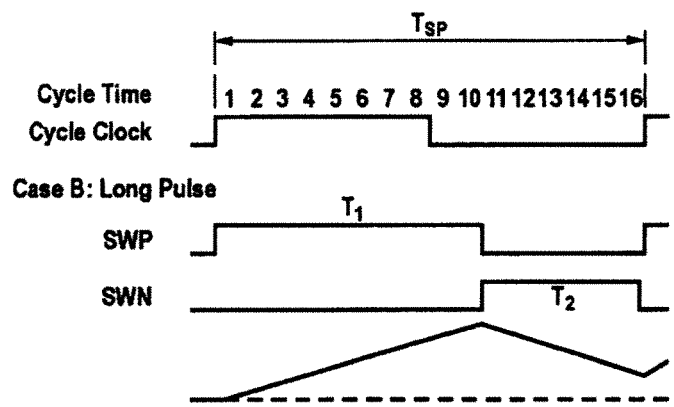
Figure 6:
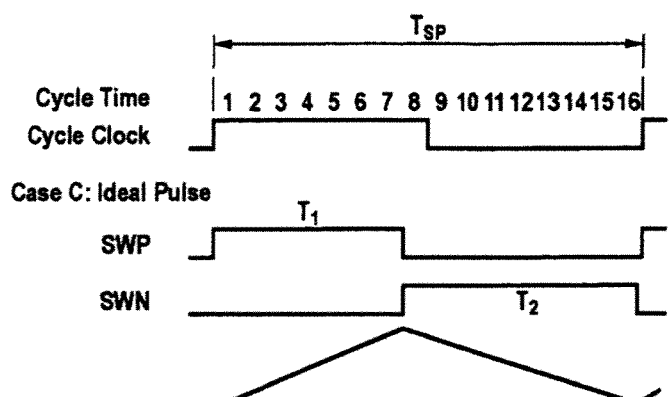
FIG. 6 shows exemplary cycles of a switching period as well as the inductor charging and discharging current as a function of the switching times of a switching voltage regulator, in accordance with one embodiment of the present invention.

As described above, to maximize the on-times of switches 102 and 104, during each switching period, the current through switch 104 is sensed and converted to a corresponding voltage $V_{S4}$ that is compared to voltage $V_1$. Signal CMP which represents the result of this comparison, in turn, causes the duty cycle of signal Drive to be incremented or decremented by one cycle of clock signal CLK. For example, assume that in one embodiment, each switching period is divided into 16 cycles of the clock signal CLK used to increment or decrement counter 156's count. Assume that during switching period U and while regulator 100 is in the PFM mode, the duty cycle of signal Drive is set, for example, to 9 cycles of signal CLK. Assume further that during this switching period, signal CMP is detecting as leading signal Conduction_Target thus indicating that switch 104 closed earlier than desired. In response, counter 156's count is incremented to increase the duty cycle of signal Drive to 10 cycles of signal CLK. Similarly, assume, for example, that during switching period U, signal CMP is detecting as lagging signal Conduction_Target thus indicating that switch 104 closed later than desired. In response, counter 156's count is decremented to decrease the duty cycle of signal Drive to 8 cycles of signal CLK. In one embodiment, signal CMP is used in every switching period to increment or decrement counter 156 to adjust the duty cycle of signal Drive. Consequently, the times at which slave switch 104 are turned off are maintained near the end of the switching periods. FIG. 6 shows exemplary 16 cycles of a switching period $T_{sp}$, the charging and discharging periods $T_2$ and $T_3$ corresponding to on-times of switches 102 and 104, as well as the current flow through inductor 106 of one example of regulator 100. As seen from FIG. 7B, the sum of the charging and discharging periods of the regulator is maintained nearly equal to the switching period $T_{SP}$.

To ensure that transient responses on signal CMP do not cause increases or decreases in the duty cycle of signal Drive, some embodiments of duty cycle controller 116 include a state machine 158. State machine 158 is adapted to increment or decrement counter 156's count based on the debounce of the comparison between signals CMP and Condition_Target. In some embodiments, the number of times the debouncing operation is carried out is programmable and may be changed. The configurable debounce operations performed by state machine 158 are used to confirm that transitions on signal CMP are not due to noise or other undesirable transient events.

Figure 7A:
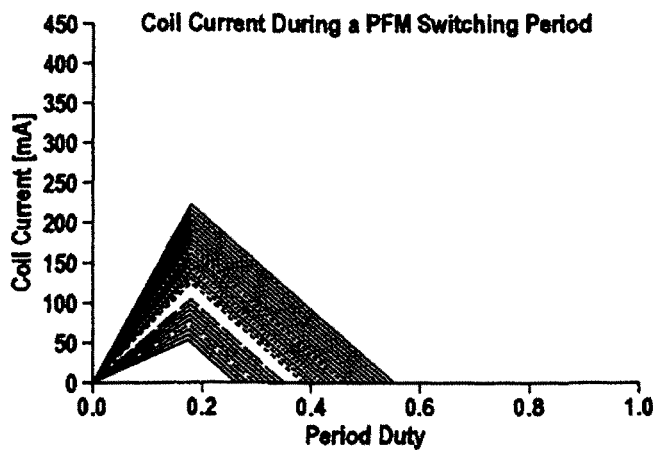
FIG. 7A shows an example of an inductor current as a function of on-off times of switches of a switching voltage regulator, as known in the prior art.

FIG. 7A is the simulations results of an inductor (coil) current as a function of master and slave switches on-off times for a conventional DC-DC regulator. The following parameters were used in generating FIG. 7A.

Figure 7B:
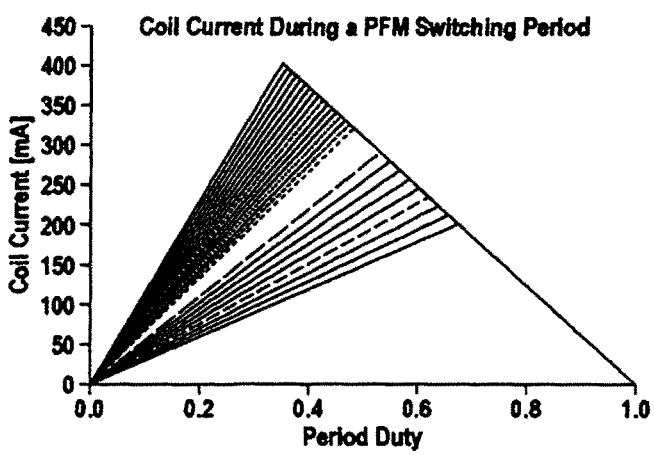
FIG. 7B shows an inductor current as a function of on-off times of switches disposed in a switching voltage regulator, in accordance with one example of the present invention.
Figure 8:
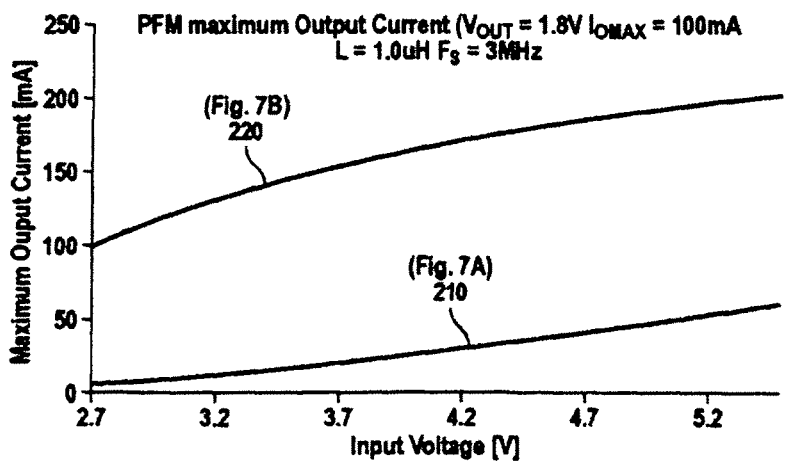
FIG. 8 show the inductor current as a function of the input voltage for the examples shown in FIGS. 7A and 7B.

Input voltage: varied from 2.7 volts to 5.5 volts;
output voltage: 1.8 volts;
Maximum output current during PWM mode: 1000 mA;
L=1.0 uH;
Switching frequency: 3 MHz
On-time of master switch when in PFM: 18% of the total switching period FIG. 7B shows the coil current as a function of master and slave switches on-off times for a DC-DC regulator in accordance with one example of the present invention and using the same parameters shown above with respect to FIG. 7A. As is seen by comparing FIGS. 7A and 7B, the inductor current is much higher when substantially the entire switching period is used during the sum of the on-times of the switches of the regulator of the present invention. Plots 210 and 220 of FIG. 8 show the maximum output current in PFM mode as a function of the input voltage for the examples shown in FIGS. 7A and 7B respectively. For each input voltage, the inductor current, and in consequence the maximum output current is significantly higher for the DC-DC regulator of the present invention than the conventional DC-DC regulator. For each input voltage, when the output current is higher than the corresponding point shown in plot 220, the exemplary DC-DC regulator operates in the PWM mode of operation, and when the output current is equal to or smaller than the corresponding point shown in plot 220, the regulator operates in the PFM mode of operation.

Figure 9A:
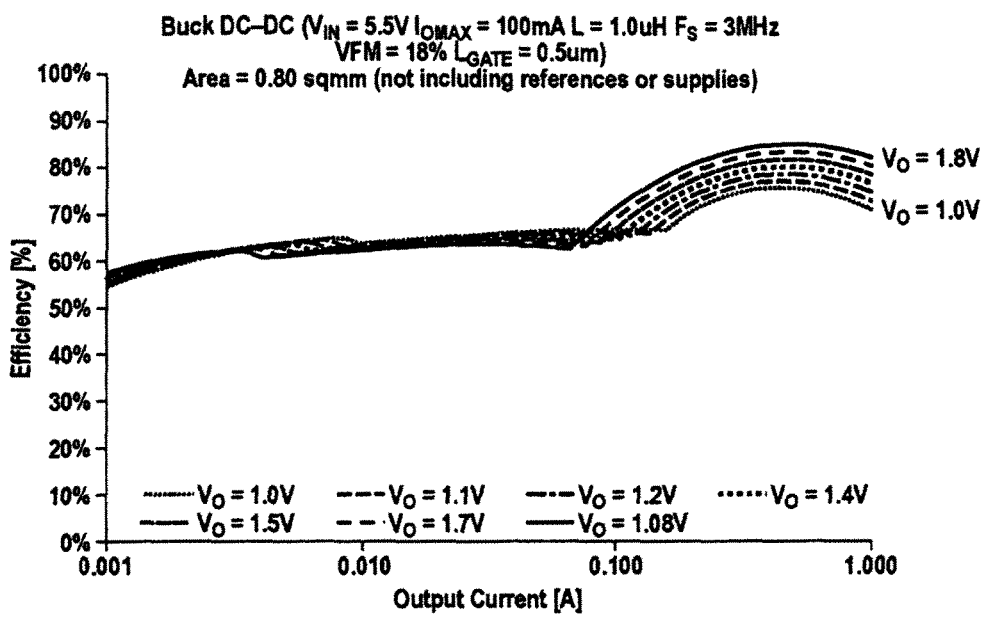
FIG. 9A shows the efficiency as a function of the output current of a switching voltage regulator, as known in the prior art.

FIG. 9A is the simulations results of the efficiency as a function of the output current for a range of output voltages of a conventional DC-DC regulator. The following parameters were used in generating FIG. 9A.

Figure 9B:
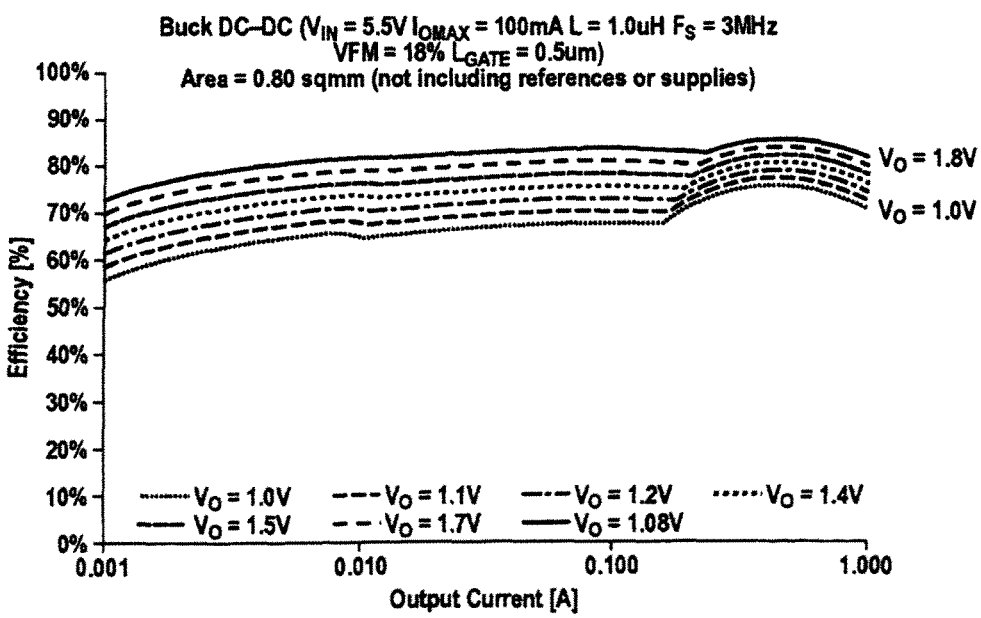
FIG. 9B shows the efficiency as a function of the output current for a range of output voltages of a switching voltage regulator, in accordance with one example of the present invention.

Input voltage: 5.5 volts;
output voltage: varying from 1.0 volt to 1.8 volts;
Maximum output current during PWM mode: 1000 mA
L=1.0 uH
Switching frequency: 3 MHz
On-time of master switch when in PFM: 18% of the total switching period FIG. 9B is the simulations results of the efficiency as a function of the output current for a range of output voltages of a DC-DC regulator, in accordance with one example of the present invention and using parameters similar to those shown with respect to FIG. 9A. As is seen by comparing FIGS. 9A and 9B, for PFM operation, the regulator of the present invention has a higher efficiency for all output voltages.

Figure 10:
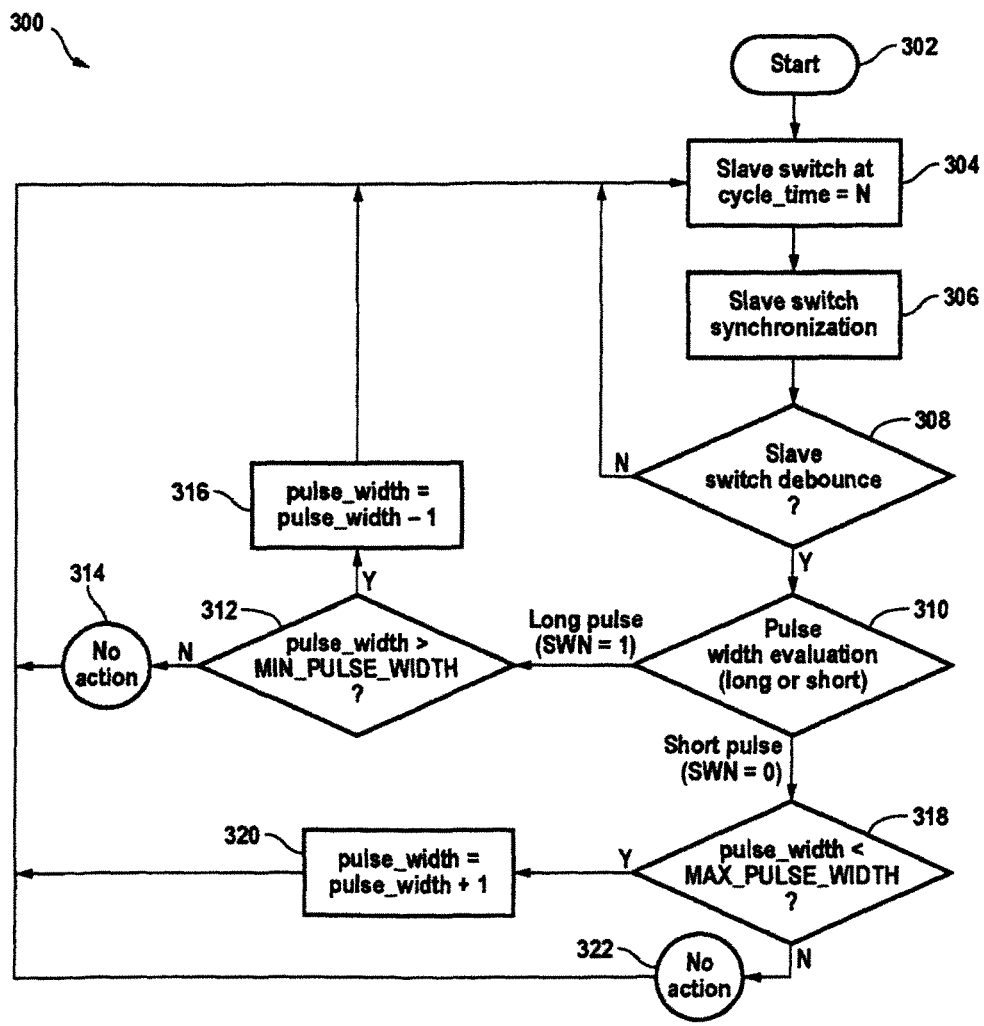
FIG. 10 is a flowchart of steps performed in accordance with one embodiment of the present invention during a PFM mode of operation.

FIG. 10 is a flowchart 300 of steps performed in accordance with one embodiment of the present invention during a PFM mode of operation. The process of voltage regulation starts at step 302. When the cycle time of the regulator reaches a predefined value, e.g., 16, the state of the slave switch is sampled 304. The sampled state is then synchronized 306 to avoid meta-stability in the event the sampling occurs during a transition of the salve switch from an on-state to an off state. The synchronized state is then debounced 308 for a number of times to confirm that the signal transitions are not due to noise or other undesirable transient events. If so confirmed, the process of voltage regulation moves to pulse size evaluation, otherwise, the process of voltage regulation moves back to step 304.

To ensure that the pulse width remains within predefined intervals defined by minimum and maximum pulse width parameters Min_Pulse_and Max_Pulse_Width, the width of the pulse applied to the salve switch is evaluated 310. If this pulse is a long pulse 310, and its width is detected as being wider 312 than the minimum pulse width Min_Pulse_the pulse width is reduced 316 by one clock cycle, and the process moves back to step 304. If this pulse is a long pulse 310, and its width is detected as not being wider 312 than the minimum pulse width Min_Pulse_Width, no action is taken 314 and the process moves back to step 304. If this pulse is a short pulse 310, and its width is detected as being narrower 318 than the maximum pulse width Max_Pulse_Width, the pulse width is increased 320 by one clock cycle, and the process moves back to step 304. If this pulse is a short pulse 310, and its width is detected as not being wider 312 than the maximum pulse width Max_Pulse_Width, no action is taken 322 and the process moves back to step 304.

The above embodiments of the present invention are illustrative and not limiting. Various alternatives and equivalents are possible. The invention is not limited by the type of switch, comparator, logic gates, PWM modulator, PFM modulator, etc. that may be used to regulate an output voltage. The invention is not limited by the type of device or integrated circuit in which the present disclosure may be disposed. Nor is the disclosure limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

The invention claimed is:

1. A switching voltage regulator comprising:
   an inductor;
   a first switch, responsive to a first signal, for charging the inductor during a first period;
   a second switch, responsive to a second signal, for discharging the inductor during a second period;
   a control block for varying a duty cycle of the first signal in accordance with a feedback signal representative of an output voltage of the switching voltage regulator;
   a first comparator for comparing a voltage across the second switch to a first voltage, determining a state of the second switch based on the comparing, and generating a first comparison signal; and
   a frequency-modulated pulse generator,
   wherein the control block further comprises a counter for incrementing its count when a transition between levels of the first comparison signal is detected as leading a corresponding transition of a target signal, and decrementing the count when the transition between levels of the first comparison signal is detected as lagging the corresponding transition of the target signal, and wherein the frequency-modulated pulse generator is adapted to vary the duty cycle of the first signal in accordance with the count.

2. The switching voltage regulator of claim 1, wherein the first comparator generates a the first comparison signal having a first level when the second switch is in a closed state and a current flowing through the second switch is above a predefined threshold value, generates the first comparison signal having the first level when the second switch is in an open state, and generates the first comparison signal having a second level when the second switch is in a closed state and the current flowing through the second switch is equal to or less than the predefined threshold value.

3. The switching voltage regulator of claim 1, wherein said first comparator further comprises:
   a current-to-voltage converter for converting a current flowing through the second switch to the voltage across the second switch, and comparing the converted voltage to the first voltage, wherein a result of the comparing determines whether the second switch is to maintain or change state.

4. The switching voltage regulator of claim 1, wherein the counter increments the count when a transition from a first level to a second level of the first comparison signal is detected as leading the corresponding transition of the target signal, and decrementing the count when the corresponding transition from the first level to the second level of the first comparison signal is detected as lagging the corresponding transition of the target signal, wherein the target signal is a clock signal.

5. The switching voltage regulator of claim 1, further comprising:
   a mode selector, responsive to said first comparator, for selecting between a pulse-width modulation and a pulse-frequency modulation mode of operation.

6. The switching voltage regulator of claim 5, wherein the mode selector switches from the pulse-width modulation mode to the pulse-frequency modulation mode of operation when a sum of the first and second periods is less than a predefined value for N consecutive switching periods of the switching voltage regulator, wherein N is an integer greater than 1.

7. The switching voltage regulator of claim 6, wherein the mode selector switches from the pulse-frequency modulation mode to the pulse-width modulation mode when following M consecutive switching periods, an output voltage of the switching voltage regulator does not reach a predefined level.

8. The switching voltage regulator of claim 5, wherein the control block varies the duty cycle of the first signal such that a sum of the first and second periods is substantially equal to a switching period of a switching voltage regulator.

9. The switching voltage regulator of claim 4, wherein the control block samples a state of the second switch for a configurable number of times before incrementing or decrementing the counter.

10. The switching voltage regulator of claim 4, further comprising circuitry for ensuring that the first and second switches are not in on states at a same time.

11. A method of regulating an input voltage to generate an output voltage, the method comprising:
   applying a first signal to close a first switch during a first period to charge an inductor;
   applying a second signal to close a second switch during a second period to discharge the inductor;
   varying a duty cycle of the first signal in accordance with a feedback signal representative of the output voltage;
   comparing a voltage across the second switch to a first voltage to determine a state of the second switch;

incrementing a count when a transition between levels of a first comparison signal is detected as leading a corresponding transition of a target signal;

decrementing the count when the transition between levels of the first comparison signal is detected as lagging the corresponding transition of the target signal; and varying the duty cycle of the first signal in accordance with the count.

12. The method of claim 11, further comprising:

generating the first comparison signal having a first level when the second switch is in a closed state and a current flowing through the second switch is greater than a predefined threshold value;

generating the first comparison signal having the first level when the second switch is in an open state; and generating the first comparison signal having a second level when the second switch is in a closed state and the current flowing through the second switch is greater than equal to the predefined threshold value.

13. The method of claim 11, further comprising:

incrementing the count when the transition from a second level to a first level of the first comparison signal is detected as leading the corresponding transition of the target signal; and decrementing the count when the transition from the second level to the first level of the first comparison signal is detected as lagging the corresponding transition of the target signal, wherein the target signal is a clock signal.

14. The method of claim 11, further comprising:

converting a current flowing through the second switch to the voltage across the second switch.

15. The method of claim 11, further comprising:

selecting between a pulse-width modulation mode and a pulse-frequency modulation mode of operation in response to a comparison signal.

16. The method of claim 15, further comprising:

switching from the pulse-width modulation mode to the pulse-frequency modulation mode of operation when a sum of the first and second periods is less than a predefined value for N consecutive switching periods, wherein N is an integer greater than 1.

17. The method of claim 16, further comprising:

switching from the pulse-frequency modulation mode to the pulse-width modulation mode of operation when following M consecutive switching periods, the output voltage does not reach a predefined level.

18. The method of claim 15, further comprising:

disabling generation of the first and second signals when the feedback signal is detected as being less than a reference voltage.

19. The method of claim 11, further comprising:

sampling a state of the second switch for a configurable number of times prior to incrementing or decrementing the count.

20. The method of claim 14, further comprising:

placing the first switch in an open state prior to turning on the second switch.

21. The method of claim 11, further comprising: varying the duty cycle of the first signal such that a sum of the first period and the second period is substantially equal to a switching period.

* * * * *